United States Patent
Smith

(10) Patent No.: US 10,005,641 B2
(45) Date of Patent: Jun. 26, 2018

(54) ELEVATOR DAMPENER AND ENERGY HARVESTING DEVICE AND METHOD

(71) Applicant: ThyssenKrupp Elevator Corporation, Alpharetta, GA (US)

(72) Inventor: Rory S. Smith, El Cajon, CA (US)

(73) Assignee: ThyssenKrupp Elevator Corporation, Alpharetta, GA (US)

( * ) Notice: Subject to any disclaimer, the term of this patent is extended or adjusted under 35 U.S.C. 154(b) by 430 days.

(21) Appl. No.: 14/740,324

(22) Filed: Jun. 16, 2015

(65) Prior Publication Data

US 2015/0360909 A1    Dec. 17, 2015

Related U.S. Application Data

(60) Provisional application No. 62/013,523, filed on Jun. 17, 2014.

(51) Int. Cl.
| | | |
|---|---|---|
| *B66B 1/34* | (2006.01) | |
| *B66B 7/06* | (2006.01) | |
| *F16F 15/00* | (2006.01) | |
| *H02N 2/18* | (2006.01) | |
| *B66B 7/04* | (2006.01) | |

(52) U.S. Cl.
CPC ............... *B66B 7/06* (2013.01); *B66B 1/34* (2013.01); *B66B 7/048* (2013.01); *F16F 15/005* (2013.01); *H02N 2/181* (2013.01); *H02N 2/186* (2013.01); *Y10T 307/527* (2015.04)

(58) Field of Classification Search
CPC ........ F16F 15/005; F16F 15/03; H02N 2/181; H02N 2/186; H02N 2/188; B66B 1/34; B66B 7/041; B66B 7/048; B66B 7/06; D07B 2201/2009; H01L 41/083; H01L 41/16; H01L 41/18
USPC ............................................. 310/339
See application file for complete search history.

(56) References Cited

U.S. PATENT DOCUMENTS

| | | | | |
|---|---|---|---|---|
| 5,485,053 A * | 1/1996 | Baz | ............. | F16F 9/306 |
| | | | | 181/208 |
| 6,364,064 B1 * | 4/2002 | Rizzi | ............. | F16F 15/005 |
| | | | | 187/292 |
| 6,629,341 B2 * | 10/2003 | Wilkie | ............. | H01L 41/082 |
| | | | | 156/222 |
| 2016/0268495 A1 * | 9/2016 | Lee | ............. | H01L 41/37 |

* cited by examiner

*Primary Examiner* — Levi Gannon
(74) *Attorney, Agent, or Firm* — Frost Brown Todd LLC

(57) ABSTRACT

A vibration dampening device is operable to dampen vibrations within ropes of an elevator car or other components to improve ride quality, and is further operable to harness or harvest and convert energy from those vibrations into electrical energy. The dampening device includes a macro-fiber composite and the vibrations are communicated or transmitted to the macro-fiber composite. The macro-fiber composite is operable to harness or harvest and convert energy from vibrations into electrical energy. Such electrical energy is communicated or transmitted to a control system of the elevator car for storage and/or use.

16 Claims, 12 Drawing Sheets

ELEVATOR DAMPENER AND ENERGY HARVESTING DEVICE AND METHOD

PRIORITY

This application claims priority to U.S. Provisional Patent Application Ser. No. 62/013,523, filed Jun. 17, 2014, entitled "Elevator Dampener and Energy Harvesting Device and Method," the disclosure of which is incorporated by reference herein.

BACKGROUND

When multi-story buildings shake under the force of a strong wind for example, a lateral vibration may be transferred to ropes or cables of an elevator system serving such a building causing the ropes to experience vibration. Other sources of vibration that can be imparted to elevator systems and in particular to elevator ropes can include the mechanical drive systems, etc. Vibrations may be observed with hoisting ropes used for suspending and driving an elevator car, as well as compensating ropes that may connect the car with a counterweight in some designs. In multi-story buildings having long ropes, a very long time must pass until such vibration will cease once induced. This is partly due to the fact that the ropes themselves may have a small attenuation factor. These vibrations may cause discomfort for passengers within an elevator car and may sometimes create difficulty in the speed control of the elevator car.

While a variety of devices, systems, and methods have been made and used for dampening vibrations of the ropes or cables used in elevator systems, it is believed that no one prior to the inventor(s) has made or used the devices, systems, and methods as described herein.

SUMMARY

Disclosed herein is an apparatus for use with an elevator system to dampen vibrations within the elevator system while also converting the kinetic energy from the vibrations to electrical energy for use within the elevator system. As such, the apparatus disclosed herein can be considered a dampening and energy harvesting device.

It is an object of the present disclosure to improve energy efficiency while improving elevator control and ride parameters by both dampening vibrations within the elevator system while capturing the vibrational energy and converting that to electrical energy for use elsewhere in the elevator system. It is another object of the present disclosure to provide electrical energy to an elevator car by harvesting kinetic energy within the elevator system. It is another object of the present disclosure to dampen rope vibrations within an elevator system and generate electrical energy from the rope vibrations while retaining the ability to independently tension the ropes in the elevator system.

According to one aspect of the present disclosure, the apparatus is installed on at least one of the ropes of the elevator system. According to another aspect of the present disclosure, the apparatus is installed between the elevator car sling and the elevator car platform. According to another aspect of the present disclosure, the apparatus described herein comprises a macro-fiber composite.

Other aspects, features, and techniques within the scope of the present disclosure will become more apparent to those of ordinary skill in the art from the following description taken in conjunction with the drawings.

Figure 1:
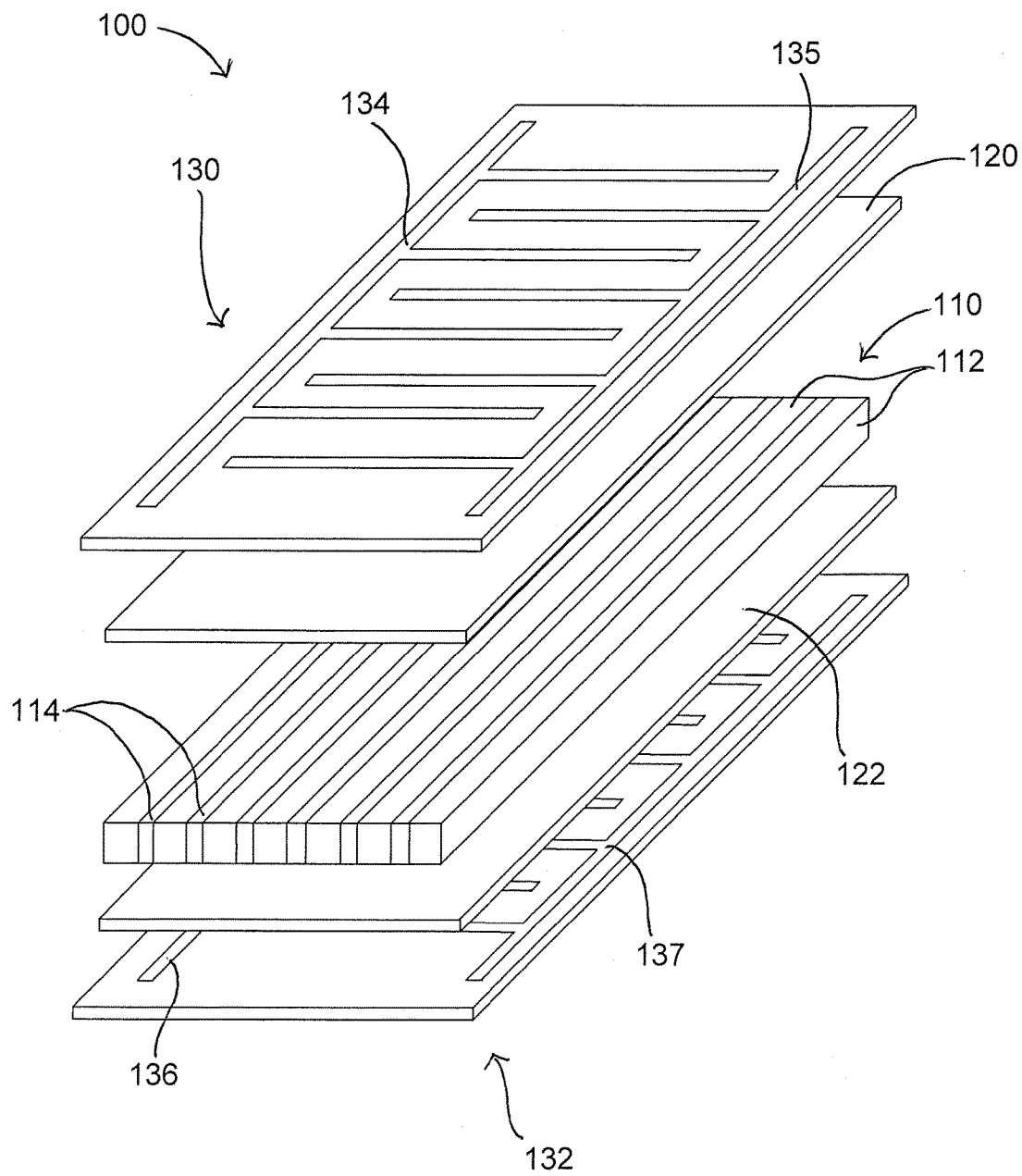
FIG. 1 depicts an exploded perspective view of a macro-fiber composite (MFC).

The drawings are not intended to be limiting in any way, and it is contemplated that various embodiments of the present disclosure may be carried out in a variety of other ways, including those not necessarily depicted in the drawings. The drawings incorporated in and forming a part of the specification illustrate several aspects, and together with the description serve to explain the principles of the present disclosure; it being understood, however, that the scope of the present disclosure is not limited to the precise arrangements shown.

DETAILED DESCRIPTION

The following description of certain embodiments should not be used to limit the scope of the present disclosure. Other examples, features, aspects, embodiments, and advantages will become apparent to those skilled in the art from the following description. As will be realized, various aspects of the present disclosure may take alternate forms, or have alternate or additional embodiments, without departing from the scope of the present disclosure. Accordingly, the drawings and descriptions should be regarded as illustrative in nature and not restrictive.

In some elevator systems, dampening systems and devices used to attenuate rope vibrations include tuned mass dampeners. In such systems and devices, tuned mass dampeners can be bands of spring steel that are attached to the hoisting ropes. Attached to each band is a mass spaced along the length of the band. The size of the mass, the length of the band, and the characteristics of the spring steel define the frequency to which this type of dampener is tuned.

Referring to FIGS. 1-7, in an embodiment of an elevator system of the present disclosure, the band of a tuned mass dampener comprises a macro-fiber composite (MFC) to thereby dampen vibrations within the ropes of the elevator system and to further harness energy from these vibrations. In this manner, the vibrational energy within the ropes may be converted to electrical energy. Such electrical energy may be transferred to a control unit of an elevator car such that the electrical energy may be used to power electronic devices within the elevator car or elsewhere. The electrical energy harnessed from the ropes may be used in combination with an external power source and may additionally or alternatively be stored for use at a later time.

Generally, an MFC is constructed using piezofibers embedded in an epoxy matrix and coated with a skin. The MFC can be extremely flexible, allowing it to be bonded to structures that have curved surface without fear of accidental breakage or additional surface treatment. Additionally the MFC may utilize the higher $d_{33}$ piezoelectric coupling coefficient, allowing it to produce higher forces and strain than typical monolithic piezoceramic materials. For instance, some exemplary MFCs may elongate up to 1800 ppm if operated at the maximum voltage rate of −500V to +1500V. MFCs are also able to harvest energy from vibrations and can also be used as a very sensitive strain gauge, sensing deformations, noise and vibrations. Techniques and ways of adapting an MFC to harvest vibration energy and convert that into electrical energy will be apparent to those of ordinary skill in the art in view of the teachings herein.

FIG. 1 depicts an exploded perspective view of a macrofiber composite (MFC) (10). The MFC (100) comprises a layer (110) of aligned rectangular piezocermaic fibers (112). The fibers (112) are held together and separated by structural epoxy (114). The structural epoxy (114) inhibits crack propagation within the peizoceramic fibers (112). The layer (110) provides for improved damage tolerance and flexibility relative to typical monolithic piezoceramic materials. The layer (110) is encompassed between layers of structural epoxy (120, 122) and film layers (130, 132). The layers of structural epoxy (120, 122) bond the film layers (130, 132) to the layer (110) of aligned rectangular piezocermaic fibers (112) and further inhibit crack propagation within the peizoceramic fibers (112). The film layers (130, 132) each comprise interdigitated electrode patterns (134, 135, 136, 137). The electrode patterns (134, 135, 136, 137) permit in-plane poling and actuation of the piezoceramic fibers (112).

Figure 2:
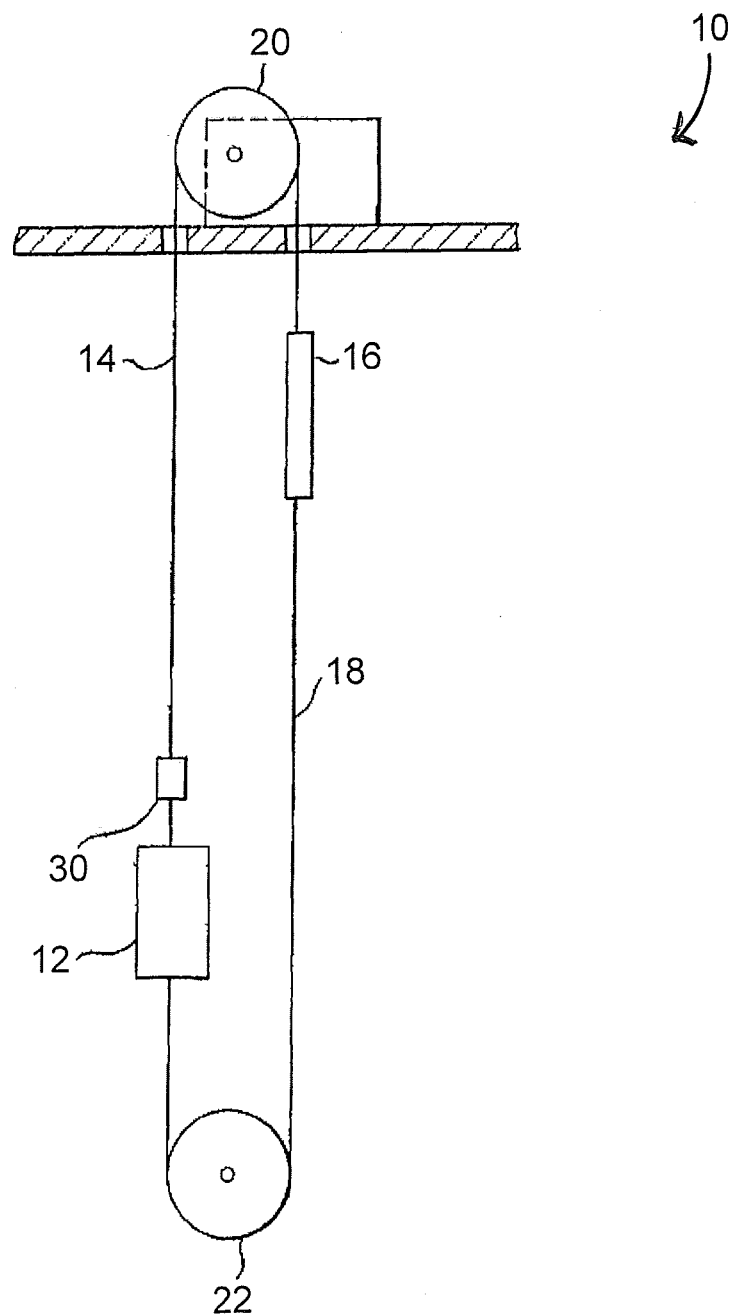
FIG. 2 depicts a schematic view of an elevator system.

FIG. 2 depicts a schematic view of an elevator system (10). The elevator system (10) comprises an elevator car (12), a plurality of hoisting ropes or cables (14), a counter weight (16), a balancing or compensating rope (18), an upper sheave (20), a lower sheave (22), and a dampening assembly (30). The hoisting ropes (14) are connected at one end to the elevator car (12) having a holding structure for the ropes. At the other end, the hoisting ropes (14) are connected to one end of the counter weight (16). The balancing rope (18) is connected at one end to the other end of the counter weight (16). The balancing rope (18) is connected at the other end to the elevator car (12). The hoisting ropes (14) and the balancing rope (18) form a closed loop with the associated components and extend within a hoistway (not shown) between the upper sheave (20) and the lower sheave (22) respectively. In view of the teachings herein, other configurations for the hoisting and the balancing ropes (14, 18) will be apparent to those of ordinary skill in the art. Furthermore, not all components depicted in FIG. 2 are required in all embodiments.

Figure 3:
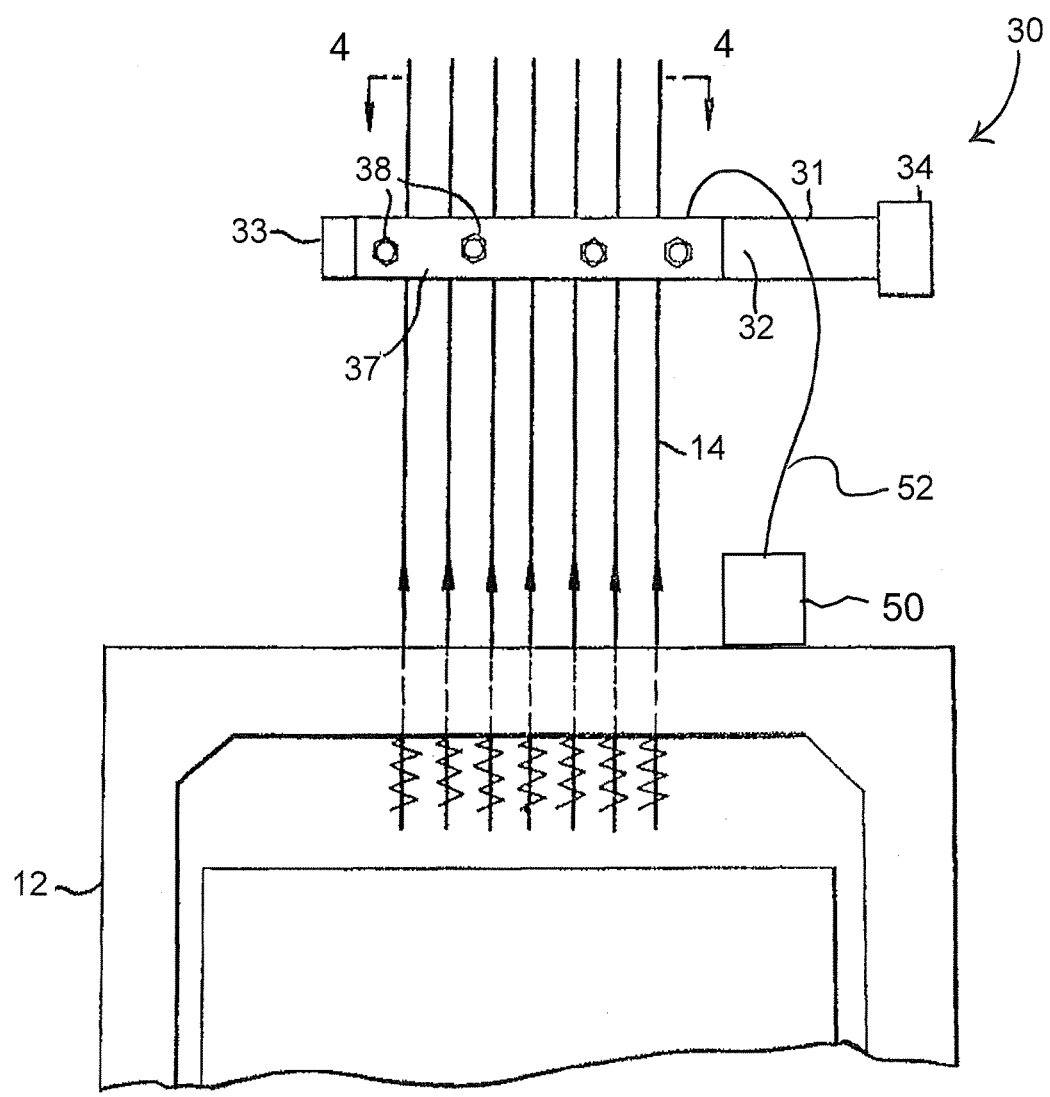
FIG. 3 depicts a front view of a dampening assembly of the elevator system of FIG. 2.

FIG. 3 depicts a front view of the dampening assembly (30) of the elevator system (10). As shown, the hoisting ropes (14) of the present embodiment comprise seven hoisting ropes disposed in parallel at substantially equal intervals to form a parallel array of ropes. The dampening assembly (30) is secured to portions of the hoisting ropes (14) close to the junction of the hoisting ropes (14) and the elevator car (12). The dampener assembly (30) is operable to act as a tuned mass dampener. As will be described in more detail below, the dampener assembly (30) is configured to dampen vibrations within the hoisting ropes (14) of the elevator system (10), and to further harness energy from these vibrations and convert it to electrical energy. The dampener assembly (30) is further configured to communicate or transmit this electrical energy to a control system (50) of the elevator car (12) such that the electrical energy may be used and/or stored to power components of the elevator car (12).

Figure 4:
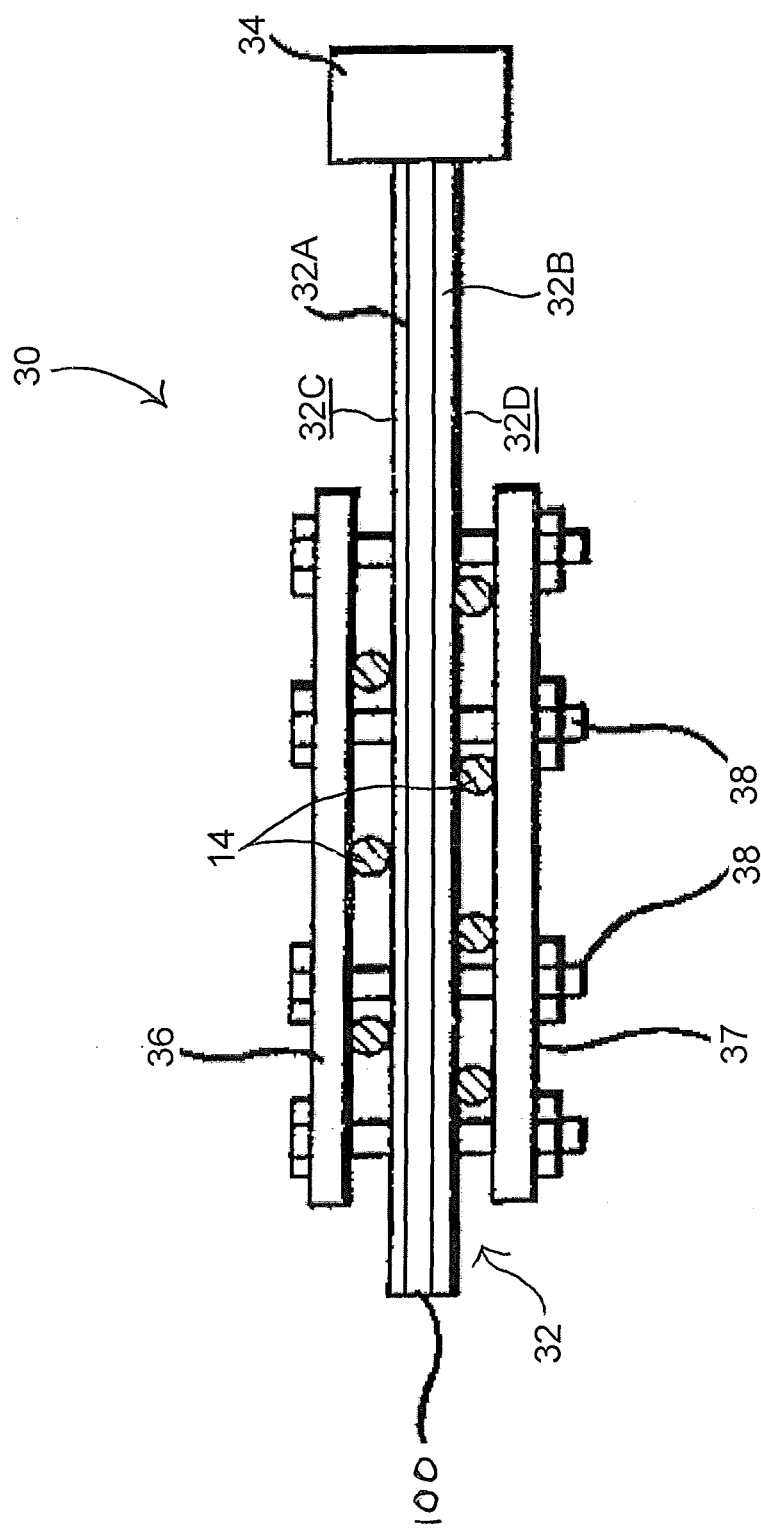
FIG. 4 depicts a cross-sectional top view taken along 4-4 of FIG. 3.
Figure 11:
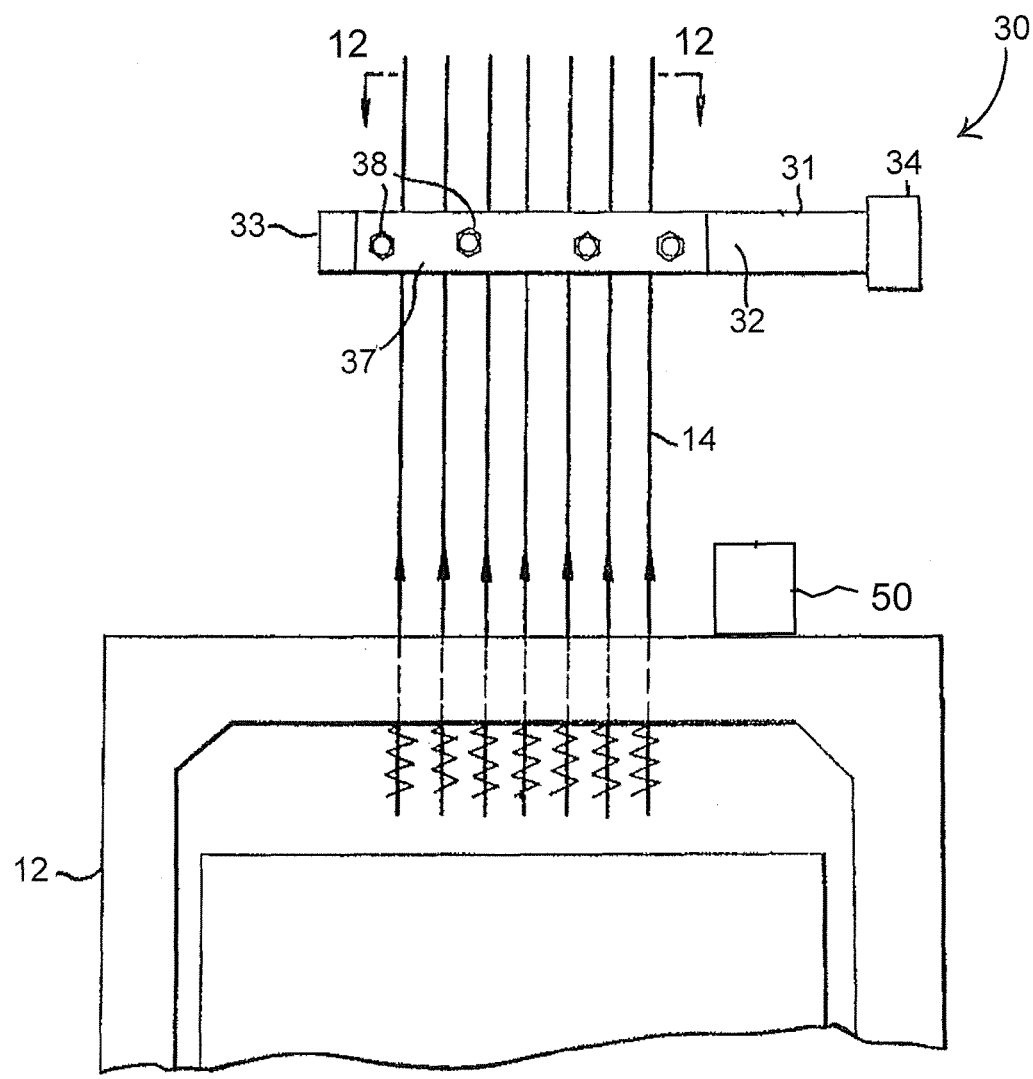
FIG. 11 depicts a front view of an alternative dampening assembly of the elevator system of FIG. 2.
Figure 12:
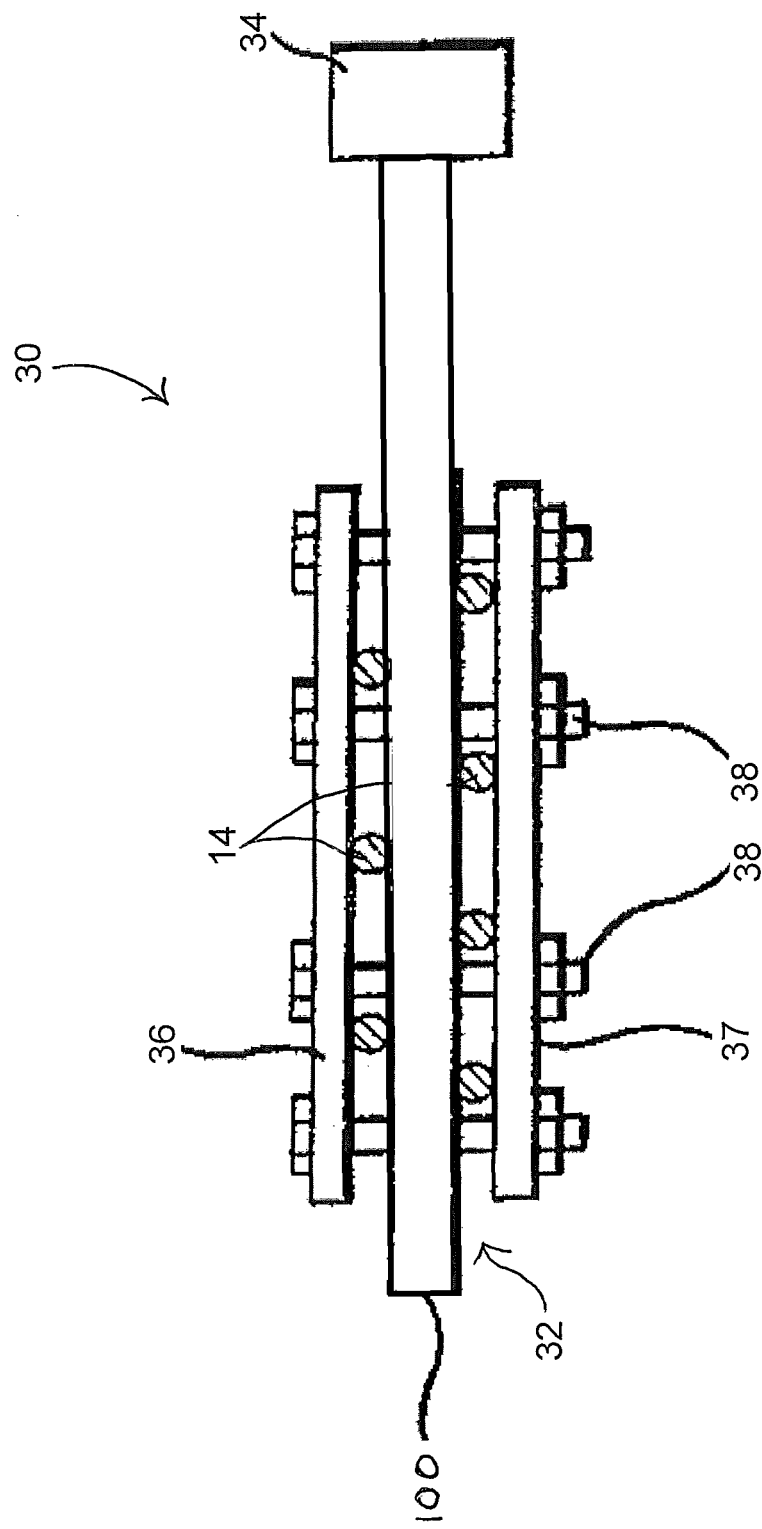
FIG. 12 depicts a cross-sectional top view taken along 12-12 of FIG. 11.

As best seen in the embodiment depicted in FIG. 4, which depicts a cross-sectional top view taken along line 4-4 of FIG. 3, the dampener assembly (30) includes a rod-shaped dampening member (32) perpendicularly traversing the parallel array of the hoisting ropes (14). The dampening member (32) includes end portions (31, 33) located at each end of the dampening member (32). Both of the end portions (31, 33) of the dampening member (32) project beyond the adjacent edges of the parallel array of the hoisting ropes (14), i.e. beyond the respective outermost hoisting ropes (14). The dampening member (32) of the present embodiment comprises the MFC (100) secured between a pair of rods (32A, 32B) such that vibrations within the rods (32A, 32B) are communicated or transmitted to the MFC (100). The rods (32A, 32B) of the dampening member (32) comprise any suitable material such as steel, aluminum, carbon fiber composites, or any other suitable metal, metal alloy, polymer, or polymer composites having sufficient rigidity and spring strength to act as a dampening member. Alternatively, the rods (32A, 32B) of the dampening member (32) may additionally be made from, or comprise, natural materials such as wood or wood composites that also have sufficient rigidity and spring strength to act as dampening members. In this manner, the vibrational energy within the dampening member (32) may be converted to electrical energy by the MFC (100). It should be understood that in some embodiments of the dampening assembly (30), the dampening member (32) may consist exclusively of the MFC (100) without the use of the rods (32A, 32B). For instance, FIGS. 11 and 12 illustrate such an embodiment, and as shown the MFC (100) directly contacts the hoisting ropes (14).

As seen in FIG. 3, one of the projecting end portions (31) is longer than the other of the projecting end portions (33) and is provided at its extremity with a weight (34). Referring again to FIG. 4, the alternate parallel hoisting ropes (14) contact a first lateral surface (32C) of the dampening member (32), and the remaining hoisting ropes (14) contact a second lateral surface (32D) of the dampening member (32) such that vibrations within the hoisting ropes (14) are communicated or transmitted to the dampening member (32) and the MFC (100). A pair of spaced opposed clamping plates (36, 37) clamp the hoisting ropes (14) against the dampening member (32) and a plurality of bolts (38) (four in the present embodiment) are threaded through the clamping plates (36, 37) and the dampening member (32) respectively and fastened to the clamping plates (36, 37) by means of associated nuts to connect the dampener assembly (30) into a unitary structure maintained in place on the parallel array of hoisting ropes (14). It should be understood that the weight (34) may be omitted in some embodiments of dampening assembly (30).

As will be described in more detail below, the MFC (100) of the dampening member (32) is electrically coupled with the control system (50) of the elevator car (12) via an electrical cable (52). Any vibrational energy within the hoisting ropes (14) may be converted to electrical energy by the MFC (100), disposed within the dampening member (32) of the dampening assembly (30), and transferred to the control system (50) to thereby power electrical components of the elevator car (12). In one embodiment, the hoisting ropes (14) may be used as a power transmission means to transmit electrical power from the control system (50) to the elevator car (12). In one embodiment, the hoisting ropes (14) may be used to transmit electrical power between the MFC (100) and the control system (50), or in some embodiments between the MFC (100) and the elevator car (12) or electrical components thereof directly. Accordingly, in some embodiments where the hoisting ropes (14) are used as a power transmission means, this use of the hoisting ropes (14) may be instead of or in addition to using the electrical cable (52). Therefore, in some embodiments the electrical cable (52) may be omitted where its function is replaced using the hoisting ropes (14).

Figure 5:
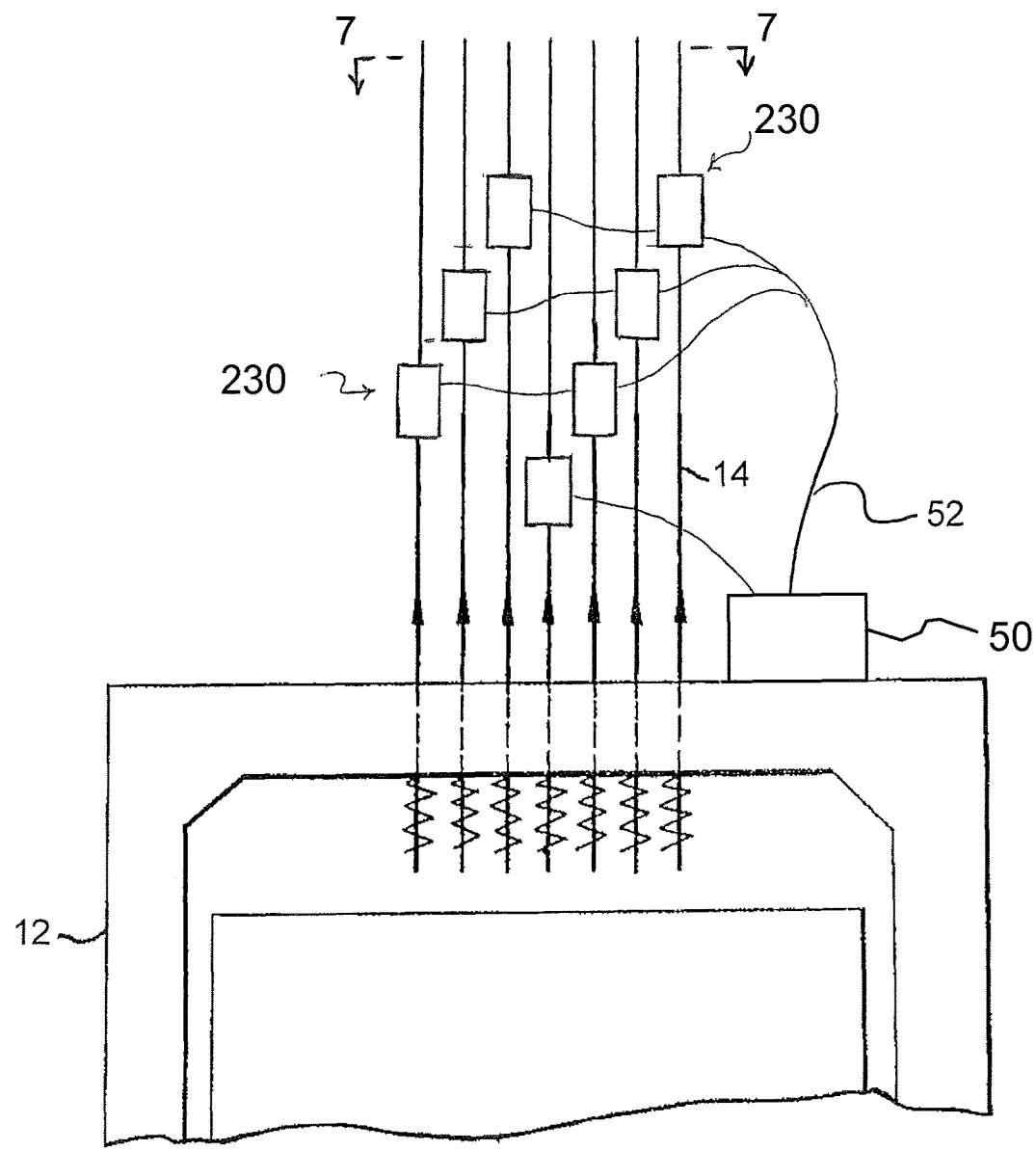
FIG. 5 depicts a front view of an alternative dampening assembly of the elevator system of FIG. 2.
Figure 6:
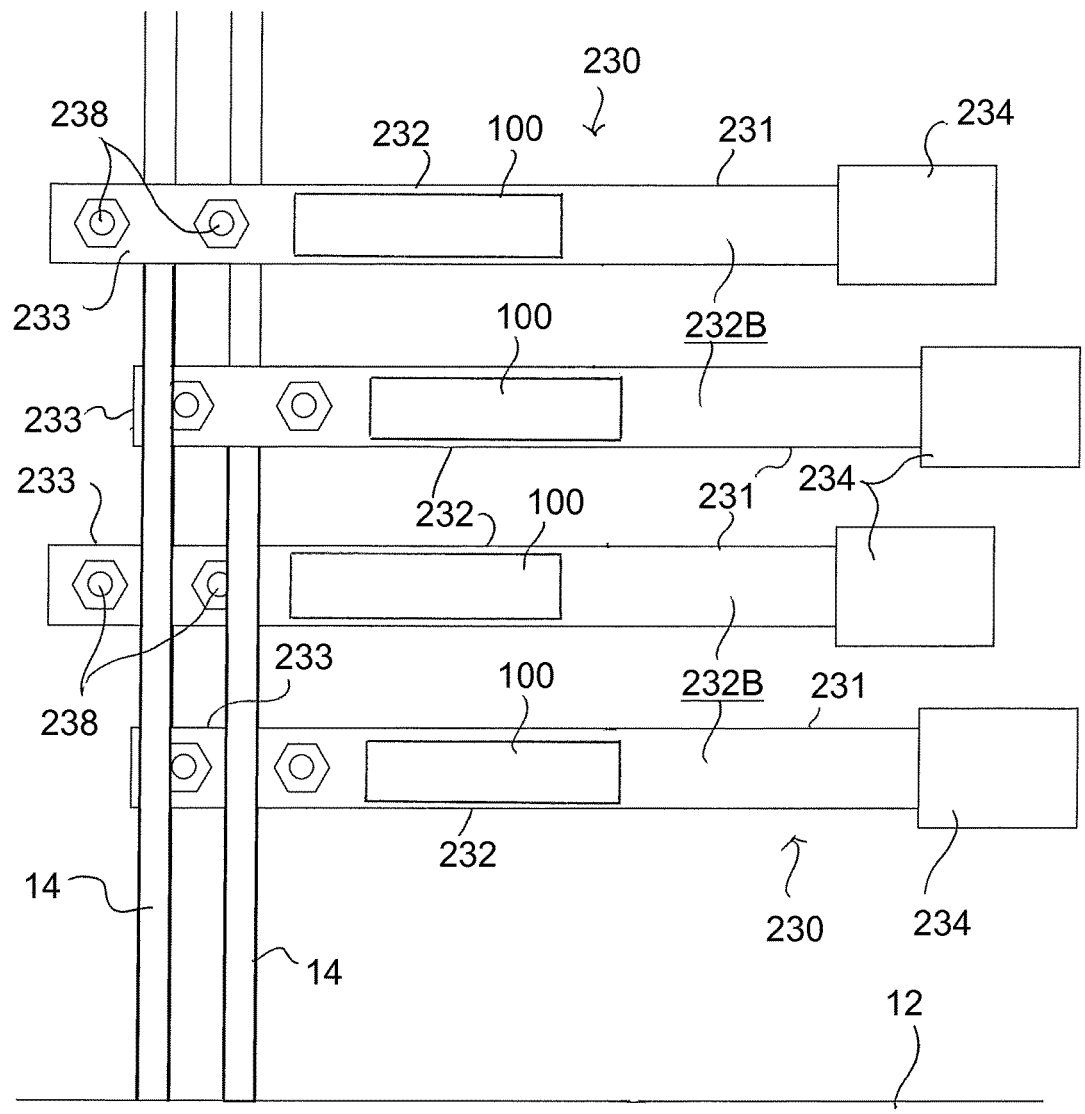
FIG. 6 depicts a side view of the dampening assembly of FIG. 5.
Figure 7:
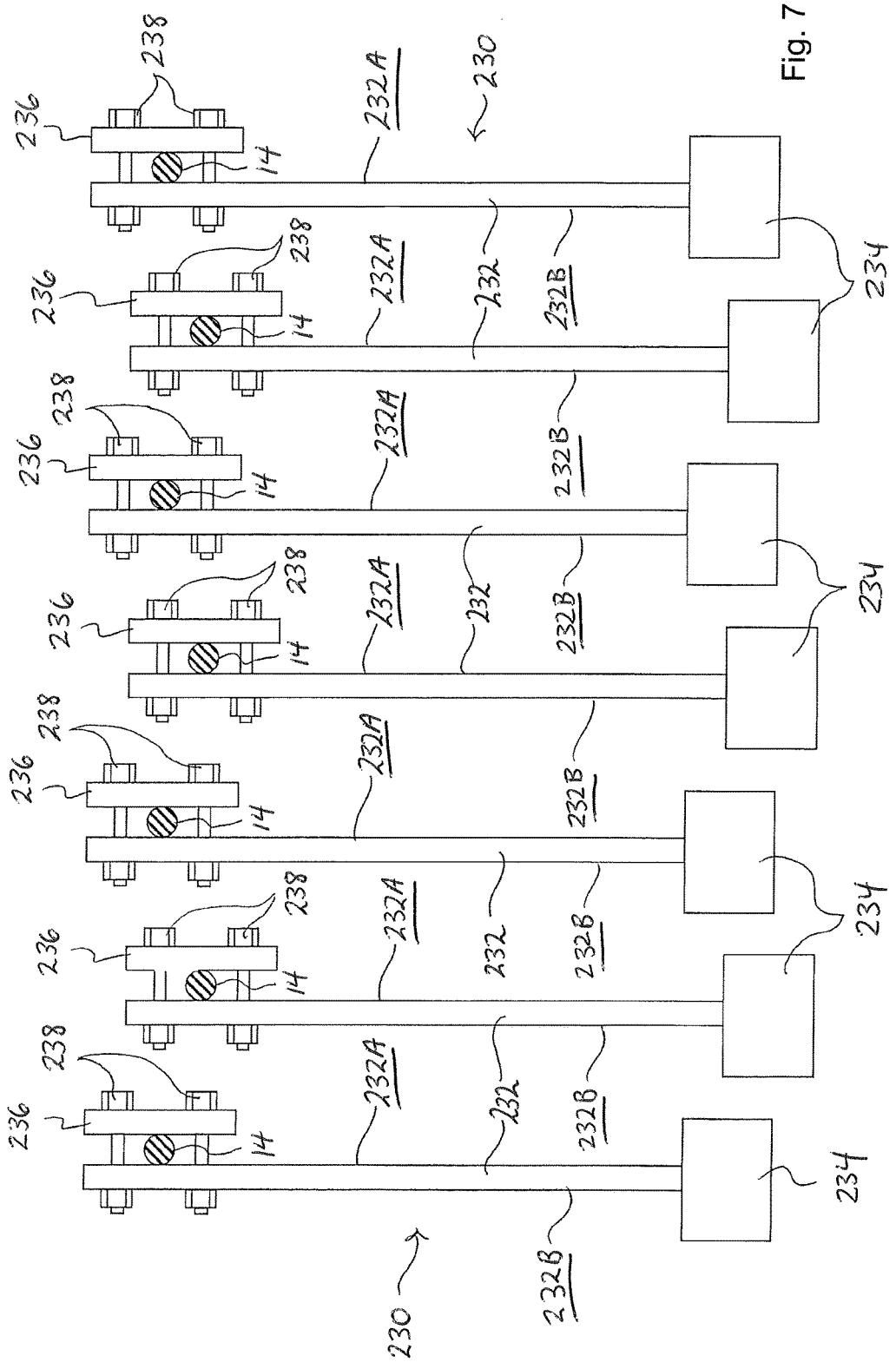
FIG. 7 depicts a top view of the dampening assembly of FIG. 5 taken along 7-7 of FIG. 5.

FIGS. 5-7 show another embodiment of elevator system (10) having a plurality of dampener assemblies (230). The dampener assemblies (230) are configured to operate substantially similar to the dampener assembly (30) discussed above except for the differences discussed below. FIG. 5 depicts a front view of the plurality of dampener assemblies (230) in the alternate embodiment of the elevator system (10). As with the dampener assembly (30) discussed above, the dampener assemblies (230) are secured to portions of the hoisting ropes (14) close to the junction of the hoisting ropes (14) and the elevator car (12). The dampener assemblies (230) of the present embodiment, however, are each secured to a separate hoisting rope (14). The dampener assemblies (230) are configured to act as tuned mass dampeners. The dampener assemblies (230) are configured to dampen vibrations within the hoisting ropes (14) of the elevator system (10), and to further harness energy from these vibrations and convert it to electrical energy. The dampener assemblies (230) are further configured to communicate or transmit this electrical energy to the control system (50) of the elevator car (12) such that the electrical energy may be used and/or stored to power components of the elevator car (12).

FIG. 6 depicts a side view of the dampening assemblies (230) of FIG. 5, while FIG. 7 depicts a top view of the dampening assemblies (230) of FIG. 5. As best shown in FIGS. 6 and 7, each of the dampener assemblies (230) include a rod-shaped dampening member (232) perpendicularly traversing the parallel array of the hoisting ropes (14). Each dampening member (232) includes end portions (231, 233) located at each end of the dampening member (232). Both of the end portions (231, 233) of the dampening member (232) project beyond the adjacent edges of the parallel array of the hoisting ropes (14), i.e. beyond the respective outermost hoisting ropes (14). Each dampening member (232) of the present embodiment comprises the MFC (100) secured to an exterior surface (232B) of the dampening member (232) such that vibrations within the dampening member (232) are communicated or transmitted to the MFC (100). The dampening member (232) comprises any suitable material such as steel, aluminum, carbon fiber composites, or any other suitable metal, metal alloy, polymer, or polymer composites having sufficient rigidity and spring strength to act as a dampening member. Alternatively, the dampening member (232) may additionally be made from, or comprise, natural materials such as wood or wood composites that also have sufficient rigidity and spring strength to act as dampening members. In this manner, the vibrational energy within the dampening member (232) may be converted to electrical energy by the MFC (100). It should be understood that in some embodiments of the dampening assemblies (230), one, more than one, or all of the dampening members (232) may consist exclusively of the MFC (100).

As seen in FIG. 6, one of the projecting end portions (231) is longer than the other projecting end portion (233) and is provided at its extremity with a weight (234). Each respective hoisting rope (14) contacts a first lateral surface (232A) of each respective dampening member (232) such that vibrations within the hoisting ropes (14) are communicated or transmitted to the dampening member (232) and the MFC (100). A clamping plate (236) clamps each respective hoisting rope (14) against each respective dampening member (232). A pair of bolts (238) are threaded through the clamping plate (236) and the dampening member (232) respectively, and fastened by means of associated nuts to connect the dampener assemblies (230) into a unitary structure maintained in place on each respective hoisting rope (14). As best seen in FIGS. 5 and 6, the dampener assemblies (230) are staggered (FIG. 6) and arranged angularly relative to one another (FIG. 5) so as accommodate each of the dampener assemblies (230) and so as to not interfere with the operation of each dampener assembly (230). In view of the teachings herein, other arrangements for the dampener assemblies (230) may be used in other embodiments. It should be understood that the weight (234) may be omitted in some embodiments of the dampening assemblies (230).

As will be described in more detail below, the MFC (100) of the dampening member (232) is electrically coupled with the control system (50) of the elevator car (12) via the electrical cable (52). Any vibrational energy within the hoisting ropes (14) may be converted to electrical energy by the MFC (100), disposed within the dampening members (232) of the dampening assemblies (230), and transferred to the control system (50) to thereby power electrical components of the elevator car (12). In one embodiment, the hoisting ropes (14) may be used as a power transmission means to transmit electrical power from the control system (50) to the elevator car (12). In one embodiment, the hoisting ropes (14) may be used to transmit electrical power between the MFC (100) and the control system (50), or in some embodiments between the MFC (100) and the elevator car (12) or electrical components thereof directly. Accordingly, in some embodiments where the hoisting ropes (14) are used as a power transmission means, this use of the hoisting ropes (14) may be instead of or in addition to using the electrical cable (52). Therefore, in some embodiments the electrical cable (52) may be omitted where its function is replaced using the hoisting ropes (14).

In the present embodiment where a plurality of dampener assemblies (230) are used, such that each of the hoisting ropes (14) are associated with or connected to one or more dedicated dampener assembly (230), the hoisting ropes (14) can be independently tensioned within the elevator system (10). This can be done without needing to remove or loosen any of the dampening assemblies (230).

While the present embodiments have been described as using seven hoisting ropes (14), it should be understood that any desired number of hoisting ropes (14) may be used. In some embodiments, one or more of the hoisting ropes (14) may be connected to separate dampener assemblies, while in some embodiments one or more of the hoisting ropes (14) may be connected to the same dampener assembly. Still yet, in some embodiments more than one dampener assembly can be connected to a given hoisting rope (14). Furthermore, while the hoisting ropes (14) of the present embodiments have been described as being arranged in a parallel array, the hoisting ropes (14) may alternatively be arranged in series or any other suitable arrangement as will be apparent to those of ordinary skill in the art in view of the teachings herein.

It should be appreciated that the dampener assemblies may additionally or alternatively be disposed on a portion of the hoisting ropes (14) close to the counter weight (16) to dampen any lateral vibrations within the hoisting ropes (14). Further, the dampener assembly may be additionally or alternatively be disposed on a portion of the balancing rope (18) adjacent to the elevator car (12) and/or the counter weight (16) where the balancing rope (18) has been formed of a plurality of rope sections, to thereby dampen any vibrations within the balancing rope (18).

In some instances, the dampener assemblies can be configured to couple to the hoisting ropes (14) or the balancing ropes (18) along their length as opposed to across their length as shown in FIGS. 3 and 4. In such a configuration, the dampener assemblies may be primarily configured to dampen vibrational motion along the vertical length or direction of the ropes as compared to primarily along the horizontal or X and Y direction as in the case of the dampener assemblies illustrated in FIGS. 3 and 4. Still in some other embodiments, multiple dampener assemblies can be used, with dampener assemblies oriented along the length and across the length of ropes so as to provide dampening in the X, Y, and Z directions. Note, however, that the manner in which the dampener assemblies couple to the ropes does not necessarily limit or prohibit the dampener assemblies from dampening vibrations from a particular direction. For instance, although the dampener assembly (30) illustrated in FIGS. 3 and 4 couples to the hoisting ropes (14) by attaching across the hoisting ropes (14), the dampener assembly (30) can still provide dampening for vibrational motion along the vertical length or direction of the hoisting ropes (14).

Figure 8:
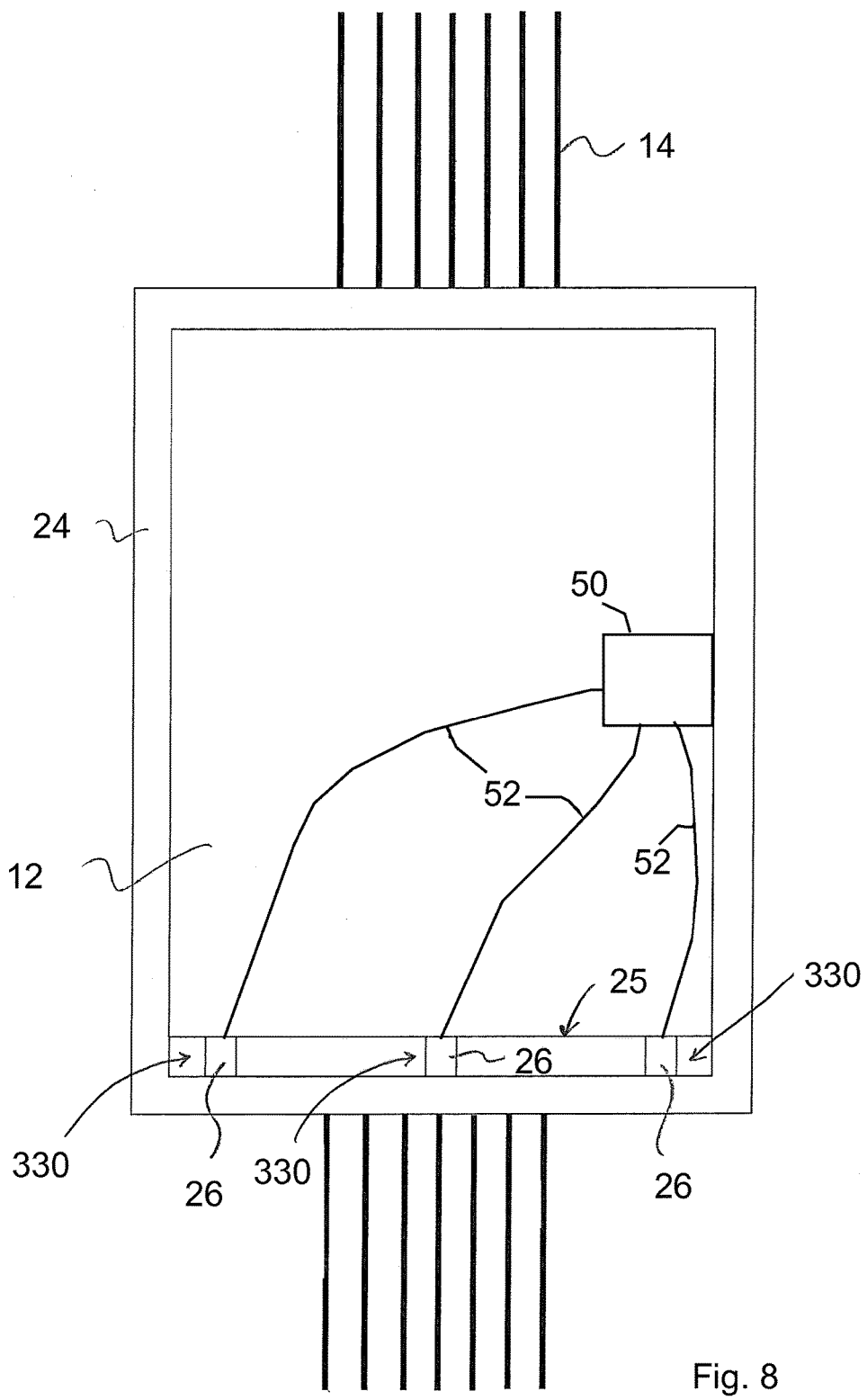
FIG. 8 depicts a front view of another dampening assembly of the elevator system of FIG. 2.

FIG. 8 depicts a front view of another dampening assembly for use with the elevator system (10). In the present embodiment, elevator system (10) includes a dampening assembly (330) configured to dampen vibrations between an elevator car sling or frame (24) and a platform (25) of the elevator car (12). The hoisting ropes (14) in the present embodiment are secured to the car sling or frame (24). The platform (25) of the elevator car (12) is secured to the car sling or frame (24) such that vertical movement of the car sling or frame (24) causes concurrent movement of the elevator car (12). Vibrations within the elevator system (10) may be transmitted to the car sling or frame (24), e.g. via ropes or other sources. Such vibrations can then be transmitted to the platform (25) of the elevator car (12) creating noise, discomfort, and worsening passenger ride quality.

To reduce vibrations transmitted to the elevator car (12), a plurality of isolation pads (26) are positioned between the platform (25) of the elevator car (12) and the car sling or frame (24). The isolation pads (26) are configured to dampen vibrations to improve the environment within the elevator car (12). Although in the illustrated embodiment, the isolation pads (26) are positioned between the platform (25) of the elevator car (12) and the car sling or frame (24), it should be understood that the isolation pads (26) may be positioned at any appropriate location. For instance, the isolation pads (26) may be positioned between a top surface or any side surface of the elevator car (12) and the car sling or frame (24).

Figure 9:
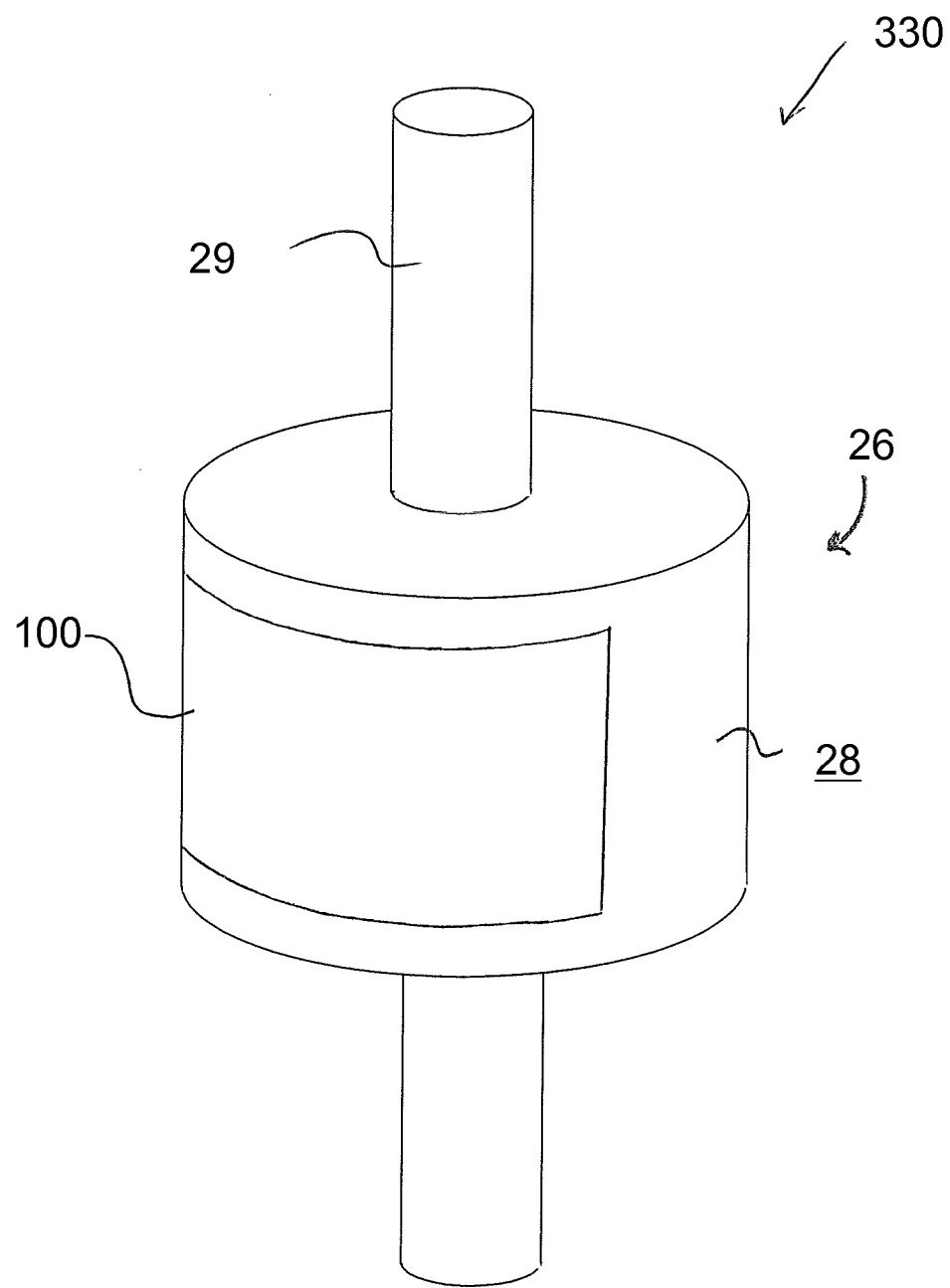
FIG. 9 depicts a perspective view of the dampening assembly of FIG. 8.

As shown in FIG. 9, which depicts a perspective view of the dampening assembly (330), the isolation pads (26) of the present embodiment comprise the MFC (100), which is secured to an exterior surface (28) of the isolation pads (26). In this fashion, vibrations within the isolation pads (26) are communicated or transmitted to the MFC (100) and the MFC (100) dampens these vibrations and converts the vibrational energy into electrical energy. As shown in the illustrated embodiment of FIGS. 8 and 9, the MFC (100) is connected with the exterior surface (28) of the isolation pad (26), which may be constructed from rubber, elastomeric, plastic, among other materials. In some other embodiments, the isolation pads (26) are comprised of the MFC (100) alone. In some embodiments there may be a fastener (29) that extends through the isolation pads (26) to hold the isolation pads (26) in place relative to the car sling or frame (24) and the platform (25) of the elevator car (12). In other embodiments this fastener (29) may be omitted.

As will be described in more detail below, the MFC (100) of the isolation pads (26) is electrically coupled with the control system (50) of the elevator car (12) via the electrical cable (52). Any vibrational energy transmitted to the car sling or frame (24), and ultimately the platform (25), may be converted to electrical energy by the MFC (100) that makes up, or is part of, the isolation pads (26). This electrical energy can then be transferred to the control system (50) to thereby power electrical components of the elevator car (12). In other embodiments, the hoisting ropes (14) may be used as a power transmission means to transmit electrical power from the MFC (100) to the control system (50), from the control system (50) to the elevator car (12), or from the MFC (100) to the elevator car (12) directly. Accordingly, in some embodiments where the hoisting ropes (14) are used as a power transmission means, this use of the hoisting ropes (14) may be instead of or in addition to using the electrical cable (52). Therefore, in some embodiments the electrical cable (52) may be omitted where its function is replaced using the hoisting ropes (14).

Figure 10:
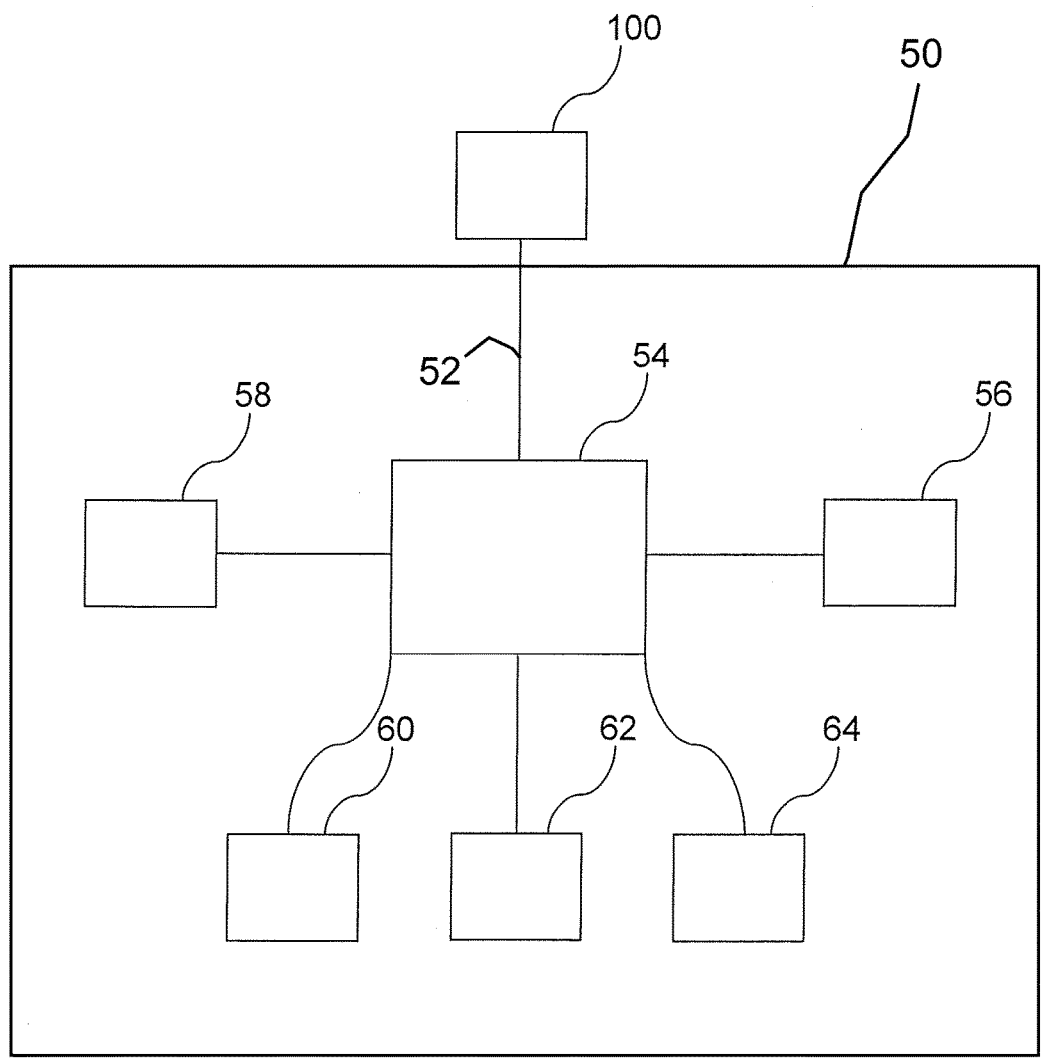
FIG. 10 depicts a schematic view of a control system of an elevator car of the elevator system of FIG. 2.

FIG. 10 shows a schematic of the control system (50) of the elevator car (12). The control system (50) comprises a control unit (54), a user interface (56), one or more lights (58), one or more sensors (60), one or more displays (62), and an energy storage device (64). The control unit (54) is operable to control the function of the user interface (56), the one or more lights (58), the one or more sensors (60), the one or more displays (62), the energy storage device (64), etc. The MFCs (100) of the dampener assemblies (30, 230, 330), are electrically coupled with the control unit (54) via the electrical cable (52) and/or the hoisting ropes (14) such that electrical energy produced by the MFCs (100) may be transmitted to the control unit (54). As discussed above, the electrical energy produced by the MFCs (100) may be used to power the user interface (56), the one or more lights (58), the one or more sensors (60), the one or more displays (62), etc. Instead or in addition, the electrical energy produced by the MFCs (100) may be stored within the energy storage device (64) for use at a later time. The storage device (64) may comprise a battery or super capacitor among other devices. In view of the teachings herein, other configurations for the control system (50) will be apparent to those of ordinary skill in the art.

Having shown and described various embodiments of the present disclosure, further adaptations of the methods and systems described herein may be accomplished by appropriate modifications by one of ordinary skill in the art without departing from the scope of the present disclosure. Several of such potential modifications have been mentioned, and others will be apparent to those skilled in the art. For instance, examples, embodiments, geometrics, materials, dimensions, ratios, steps, and the like discussed above are illustrative and are not required. Accordingly, the scope of the present disclosure should be considered in terms of the following claims and is understood not to be limited to the details of structure and operation shown and described in the specification and drawings.

I claim:

1. An apparatus for dampening vibrations within an elevator system and producing electrical energy from the kinetic energy of the vibrations, the apparatus comprising:
   an elongate member coupled to at least one hoisting rope of the elevator system;
   a macro-fiber composite connected with the elongate member, wherein the macro-fiber composite comprises a plurality of piezoceramic fibers and an epoxy operable to dampen vibrations within the at least one hoisting rope and convert kinetic energy from the vibrations into electrical energy;
   a control system in electrical communication with the macro-fiber composite, wherein the electrical energy produced from the kinetic energy from the vibrations is transmitted from the macro-fiber composite to the control system; and
   an energy storage device that receives the electrical energy from the macro-fiber composite.

2. The apparatus of claim 1, wherein the control system is operable to use the electrical energy to control operation of at least one component of an elevator car.

3. The apparatus of claim 1, wherein the elongate member comprises one or more rod members in direct contact with and connected with the at least one hoisting rope.

4. The apparatus of claim 3, wherein the macro-fiber composite is secured to a select one of the one or more rod members.

5. The apparatus of claim 1, wherein the macro-fiber composite is in direct contact with the at least one hoisting rope.

6. The apparatus of claim 1, wherein the apparatus further comprises a weight secured to the elongate member.

7. The apparatus of claim 1, wherein the macro-fiber composite is electrically coupled with the control system via a cable.

8. The apparatus of claim 1, wherein the energy storage device comprises a battery.

9. The apparatus of claim 1, wherein the energy storage device comprises a super capacitor.

10. An apparatus for providing energy to an elevator car, the apparatus comprising:
    an energy harvesting device, wherein the energy harvesting device is in at least indirect communication with a select one or both of at least one hoisting rope and the elevator car sling, wherein the energy harvesting device is operable to convert kinetic energy from vibrations to electrical energy;
    a control system operable to control operation of at least one component of the elevator car using at least a portion of the electrical energy provided by the energy harvesting device to the control system; and
    an energy storage device operable to receive and store electrical energy from the energy harvesting device.

11. The apparatus of claim 10, wherein the energy harvesting device is further operable to dampen vibrations within the at least one hoisting rope.

12. The apparatus of claim 11, wherein the energy harvesting device comprises a tuned mass dampener having a macro-fiber composite.

13. The apparatus of claim 10, wherein the energy harvesting device is further operable to dampen vibrations within the elevator car sling.

14. The apparatus of claim 13, wherein the energy harvesting device comprises at least one isolation pad having a macro-fiber composite.

15. A method of providing energy to an elevator car, comprising the steps of:
    connecting a dampening and energy harvesting device to at least one rope of the elevator car, wherein the dampening and energy harvesting device comprises a macro-fiber composite in communication with the at least one rope;
    converting vibrational motion from the at least one rope into electrical energy using the macro-fiber composite;
    transmitting the electrical energy to a control system via an electrical cable connecting the control system to the macro-fiber composite, wherein the step of transmitting the electrical energy to the control system comprises directing the electrical energy to an energy storage device; and
    distributing the electrical energy from the control system to the elevator car.

16. The method of claim 15, further comprising the step of dampening vibrational motion within the at least one rope.

* * * * *